(12) United States Patent
Kwak

(10) Patent No.: US 12,662,100 B2
(45) Date of Patent: Jun. 23, 2026

(54) SOLENOID VALVE FOR BRAKE SYSTEM

(71) Applicant: HL MANDO CORPORATION, Gyeonggi-do (KR)

(72) Inventor: Sungho Kwak, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/805,529

(22) Filed: Aug. 15, 2024

(65) Prior Publication Data

US 2025/0145139 A1 May 8, 2025

(30) Foreign Application Priority Data

Nov. 7, 2023 (KR) ........................ 10-2023-0152862

(51) Int. Cl.
*F16K 31/06* (2006.01)
*B60T 15/02* (2006.01)

(52) U.S. Cl.
CPC ........ *B60T 15/028* (2013.01); *F16K 31/0696* (2013.01)

(58) Field of Classification Search
None
See application file for complete search history.

(56) References Cited

U.S. PATENT DOCUMENTS 6,776,391 B1 * 8/2004 Goossens ................ B60T 8/363
251/337
8,540,212 B2 * 9/2013 Speer .................. F16K 31/0665
251/64

8,590,859 B2 * 11/2013 Kurz ................... F16K 31/0665
251/64
8,870,160 B2 * 10/2014 Ambrosi ................. B60T 8/363
251/64
9,080,684 B2 * 7/2015 Stahr ........................ H01F 7/081
9,714,018 B2 * 7/2017 Jeon ........................ B60T 8/363
11,110,905 B2 * 9/2021 Jeon ...................... B60T 15/043
11,313,488 B2 * 4/2022 Lee .......................... B60T 8/363
11,953,103 B2 * 4/2024 Hirano ............... F16K 31/0686
2005/0056800 A1 * 3/2005 Modien ............... F16K 31/0651
251/64
2010/0276618 A1 * 11/2010 Schulz ............... F16K 31/0693
251/129.15

(Continued)

FOREIGN PATENT DOCUMENTS

KR 10-1622149 5/2016
KR 10-2016-0091565 8/2016
KR 10-2075614 2/2020

*Primary Examiner* — Matthew W Jellett
(74) *Attorney, Agent, or Firm* — WOMBLE BOND DICKINSON (US) LLP

(57) ABSTRACT

Disclosed is a solenoid valve for a brake system. The solenoid valve for the brake system according to an embodiment may include an armature positioned inside a sleeve and configured to move up and down along an axial direction together with a plunger to open or close an orifice of a valve seat, and a damper provided between the armature and an inner upper end of the sleeve, wherein the damper may include a body portion inserted in a coupling hole provided in an upper side of the armature, and a head portion being at least two or more bending arms divided by a slot extending in a diameter direction, the head portion being provided at an upper end of the body portion.

21 Claims, 6 Drawing Sheets

(56) References Cited

U.S. PATENT DOCUMENTS

| | | | |
|---|---|---|---|
| 2012/0161047 A1* | 6/2012 | Ambrosi | F16K 31/0686 |
| | | | 251/129.15 |
| 2015/0130265 A1* | 5/2015 | Leventhal | B60T 13/662 |
| | | | 251/48 |
| 2019/0186651 A1* | 6/2019 | Pellmann | F16K 31/0655 |
| 2022/0221080 A1* | 7/2022 | Shioi | F16K 31/0696 |

\* cited by examiner

SOLENOID VALVE FOR BRAKE SYSTEM

CROSS-REFERENCE TO RELATED APPLICATION(S)

This application is based on and claims priority under 35 U.S.C. § 119 to Korean Patent Application No. 10-2023-0152862, filed on Nov. 7, 2023, in the Korean Intellectual Property Office, the disclosure of which is incorporated by reference herein in its entirety.

BACKGROUND

1. Field

The disclosure relates to a solenoid valve for a brake system, and more particularly, to a solenoid valve for a brake system capable of reducing operating noise of the valve by increasing a collision time through bending when a damper collides with a sleeve to reduce an impact force transferred to the sleeve.

2. Description of the Related Art

In general, an electronic brake system includes hydraulic lines extending from the master cylinder that generates hydraulic pressure by an operation of the brake pedal to the wheel cylinders provided in the respective wheels of the vehicle, and a plurality of solenoid valves that open or close the flow paths of the hydraulic lines.

A cut valve for connecting/disconnecting the master cylinder to/from the hydraulic lines among the solenoid valves of the electronic brake system includes an armature for the forward and backward movement of the plunger that opens and closes the orifice of the valve seat and a sleeve for guiding the forward and backward movement, to disconnect, when a driver presses the brake pedal for braking, the master cylinder from the hydraulic lines and connect, when the driver releases pressure applied to the brake pedal to release braking, the master cylinder to the hydraulic lines.

SUMMARY

It is an embodiment of the disclosure to provide a solenoid valve for a brake system capable of significantly reducing noise caused by a collision between a damper and a sleeve when the valve operates.

It is an embodiment of the disclosure to provide a solenoid valve for a brake system capable of increasing, upon a collision of a damper with a sleeve when the valve operates, a collision time through bending to reduce an impact force transferred to the sleeve.

It is an embodiment of the disclosure to provide a solenoid valve for a brake system capable of preventing deformation and damage of a damper due to repeated collisions between the damper and a sleeve when the valve operates.

Additional aspects of the disclosure will be set forth in part in the description which follows and, in part, will be obvious from the description, or may be learned by practice of the disclosure.

In accordance with an embodiment of the disclosure, there may be provided a solenoid valve for a brake system including an armature positioned inside a sleeve and configured to move up and down along an axial direction together with a plunger to open or close an orifice of a valve seat, and a damper provided between the armature and an inner upper end of the sleeve, wherein the damper may include a body portion inserted in a coupling hole provided in an upper side of the armature, and a head portion being at least two or more bending arms divided by a slot extending in a diameter direction, the head portion being provided at an upper end of the body portion.

The body portion may include at least two or more long grooves extending in an axial direction.

Each of the long grooves may be positioned at the same location in axial direction as the slot.

The head portion may further include a third rounding portion provided between the long groove and the slot.

The head portion may further include a first rounding portion extending from an upper end of the body portion on a lower surface of the head portion, a taper portion corresponding to the lower surface of the head portion, and extending outward from the first rounding portion in such a way as to be inclined upward from a center of the head portion, and a second rounding portion formed on an upper surface of the head portion and bent from the taper portion.

The armature may include a chamfer portion provided on an outer circumferential surface of the coupling hole and spaced apart from the first rounding portion, and a flat portion extending from the chamber portion in a diameter direction.

The sleeve may include a damper contact portion provided at an inner upper end of the sleeve, wherein the second rounding portion is in contact with the damper contact portion.

The solenoid valve for the brake system may be a Normal Open Type.

In accordance with another embodiment of the disclosure, there may be provided a solenoid valve for a brake system including a valve seat including an orifice penetrating the valve seat in an axial direction, a plunger configured to open or close the orifice by moving back and forth in the axial direction, an elastic member configured to provide an elastic force in a direction in which the plunger opens the orifice, an armature provided on an upper side of the plunger and configured to move back and forth in the axial direction together with the plunger, a magnetic core accommodating the valve seat, the plunger, and the elastic member therein, and configured to provide a driving force to the armature in a direction in which the plunger closes the orifice, a sleeve accommodating the armature therein such that the armature is movable back and forth in the axial direction inside the sleeve, the sleeve being coupled to the magnetic core, and a damper provided between the armature and the sleeve, and configured to be elastically deformed toward the armature at an outer circumferential portion by being pressed to an inner upper end of the sleeve by an elastic force provided by the elastic member, and be elastically restored upward at the outer circumferential portion by being spaced apart from the inner upper end of the sleeve by a driving force provided by the magnetic core.

The damper may include a body portion inserted in a coupling groove provided in an upper side of the armature, and a head portion including a first rounding portion extending from an upper end of the body portion on a lower surface of the head portion, a taper portion extending outward from the first rounding portion on the lower surface in such a way as to be inclined upward from a center of the head portion, and a second rounding portion bent from the taper portion on an upper surface of the head portion.

The body portion may include at least two or more long grooves extending in the axial direction.

The head portion may further include a slot extending in a diameter direction from an upper end of each of the long grooves via a third rounding portion.

The armature may include a chamfer portion provided on an outer circumferential surface of the coupling hole and spaced apart from the first rounding portion, and a flat portion extending from the chamber portion in a diameter direction.

The sleeve may include a damper contact portion provided at an inner upper end of the sleeve, wherein the second rounding portion is in contact with the damper contact portion.

The magnetic core may include a flange protruding from an outer circumferential surface of the magnetic core, a first flow path extending in the axial direction, wherein the valve seat is accommodated in the first flow path, a second flow path extending in a radial direction between the valve seat and the flange, and a plunger accommodating space formed above the valve seat, wherein the plunger is accommodated in the plunger accommodating space.

One end of the elastic member may be supported by a supporting portion provided in the plunger, and another end of the elastic member may be supported by an elastic member resting portion provided in the plunger accommodating space.

The solenoid valve for the brake system may further include an inlet filter provided toward the first flow path, and an outlet filter provided toward the second flow path.

The sleeve may further include an excitation coil coupled to an outer circumferential surface of the sleeve and configured to generate a driving force of the magnetic coil.

The armature may further include an armature flow path extending from a lower end to an upper end of the armature in the axial direction.

The solenoid valve for the brake system may be a Normal Open Type.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
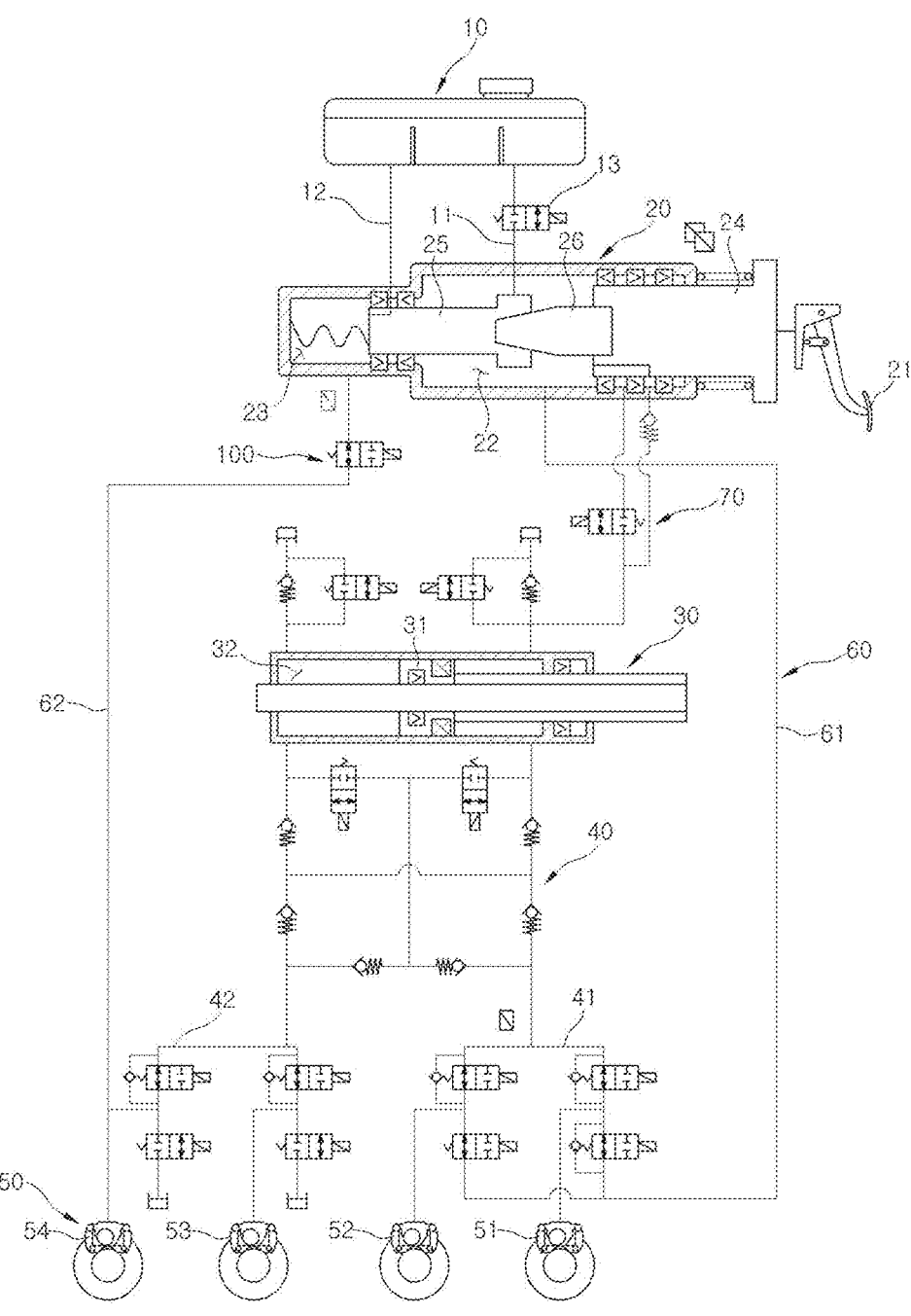
FIG. 1 is a circuit diagram schematically showing a configuration of a brake system for a vehicle including a solenoid valve for a brake system according to an embodiment of the disclosure.

Hereinafter, the embodiments of the present disclosure will be described in detail with reference to the accompanying drawings. The following embodiments are provided to transfer the concepts of the present disclosure to one of ordinary skill in the technical art to which the present disclosure pertains. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

FIG. 1 is a circuit diagram schematically showing a configuration of a brake system for a vehicle including a solenoid valve for a brake system according to an embodiment of the disclosure.

First, referring to FIG. 1, the brake system for the vehicle including the solenoid valve for the brake system according to an embodiment of the disclosure may include a reservoir 10, a master cylinder 20, a hydraulic pressure supply device 30, a hydraulic pressure control line 40, a wheel cylinder 50, and an electronic control unit (ECU) (not shown).

The reservoir 10 may store a pressing medium such as brake oil and be connected to the master cylinder 20. To this end, the reservoir 10 may include a first reservoir line 11 formed to communicate with a first master chamber 22 which will be described below, a second reservoir line 12 provided to communicate with a second master chamber 23, and a solenoid valve 13 provided on the first reservoir line 11 to control bidirectional flows of the pressing medium.

When a driver applies a pedal effort onto a brake pedal 21 for braking, the master cylinder 20 may provide a reaction force to the driver to provide a stable pedal feeling to the driver and simultaneously pressurize and discharge the pressing medium accommodated therein by an operation of the brake pedal 21.

More specifically, the master cylinder 20 may include the first master chamber 22 provided at an entrance connected to the brake pedal 21, and the second master chamber 23 extending from the first master chamber 22. Also, the master cylinder 20 may further include a first master piston 24 that is displaceable by an operation of the brake pedal 21, a second master piston 25 that is displaceable by displacement of the first master piston 24 or hydraulic pressure of the pressing medium contained in the first master chamber 22, and a pedal simulator 26 provided between the first master piston 24 and the second master piston 25 to provide a pedal feeling to the driver through an elastic restoring force generated during compression.

That is, the first master piston 24 and the second master piston 25 may be provided in the first master chamber 22 and the second master chamber 23, respectively, and move back and forth (left and right in FIG. 1) to form hydraulic pressure or negative pressure in the pressing medium contained in each of the first master chamber 22 and the second master chamber 23. The first master chamber 22 may be formed to have a relatively greater inner diameter than the second master chamber 23. Also, the pedal simulator 26 may be formed of an elastic material such as rubber that is compressible and expandable.

The hydraulic pressure supply device 30 may receive a driver's braking intention as an electrical signal from a pedal displacement sensor that detects displacement of the brake pedal 21, and generate hydraulic pressure of the pressing medium through a mechanical operation. To this end, the hydraulic pressure supply device 30 may include a pressure chamber 32 of which a volume changes by a hydraulic piston 31, a motor (not shown) that generates a rotation force by an electrical signal from the pedal displacement sensor, and a power converter (not shown) that converts a rotation motion of the motor into a linear motion for moving the hydraulic piston 31 back and forth.

The hydraulic pressure control line 40 may include a plurality of lines and valves configured to control hydraulic pressure that is transferred from the hydraulic pressure supply device 30 to the wheel cylinder 50 for braking each of wheels RR, RL, FR, and FL.

More specifically, the hydraulic pressure control line 40 may include a first hydraulic pressure control line 41 for controlling hydraulic pressure of first and second wheel cylinders 51 and 52, a second hydraulic pressure control line 42 for controlling hydraulic pressure of third and fourth wheel cylinders 53 and 54, and a plurality of control lines provided between the pressure chamber 32 and the first and second hydraulic pressure control lines 41 and 42. The control lines may include valves that allow or block a flow of the pressing medium in one direction or control a flow of the pressing medium in both directions. Also, the valves may be opened or closed by an electrical signal received from the ECU.

Meanwhile, the brake system for the vehicle including the solenoid valve for the brake system according to an embodiment of the disclosure may further include a backup line 60 and an inspection line 70.

When the brake system for the vehicle including the solenoid valve for the brake system according to an embodiment of the disclosure cannot operate normally due to a failure or the like, the backup line 60 may supply the pressing medium discharged from the master cylinder 20 to the wheel cylinder 50 for braking, and the backup line 60 may include a first backup line 61 and a second backup line 62.

One end of the first backup line 61 may be connected to the first master chamber 22, and another end may be connected to the first hydraulic pressure control line 41. The first backup line 61 may be provided with at least one valve capable of controlling bidirectional flows of the pressing medium.

One end of the second backup line 62 may be connected to the second master chamber 23, and another end may be connected to the second hydraulic pressure control line 42. The second backup line 62 may include the solenoid valve 100 for the brake system according to an embodiment of the disclosure capable of controlling bidirectional flows of the pressing medium. The solenoid valve 100 for the brake system may be a Normal Open Type of valve that is normally open and closed in response to reception of a closing signal from the ECU.

That is, while the brake system for the vehicle operates normally, the solenoid valve 100 for the brake system may operate, in response to reception of a closing signal from the ECU when a driver presses the brake pedal 21 for braking, to be closed to block the master cylinder 20 and the hydraulic pressure control line 40 and thus prevent the pressing medium in the master cylinder 20 from being directly transferred to the wheel cylinder 20, and, when a failure, etc. has occurred in the brake system for the vehicle, the solenoid valve 100 for the brake system may be maintained in an open state even when the driver presses the brake pedal 21 for braking in order to transfer the pressing medium in the master cylinder 20 directly to the wheel cylinder 50.

The inspection line 70 may be provided between the master cylinder 20 and the hydraulic pressure supply device 30 in order to inspect leaks of various components included in the master cylinder 20. The inspection line 70 may include valves that allow or block a flow of the pressing medium in one direction or control a flow of the pressing medium in both directions.

Figure 2:
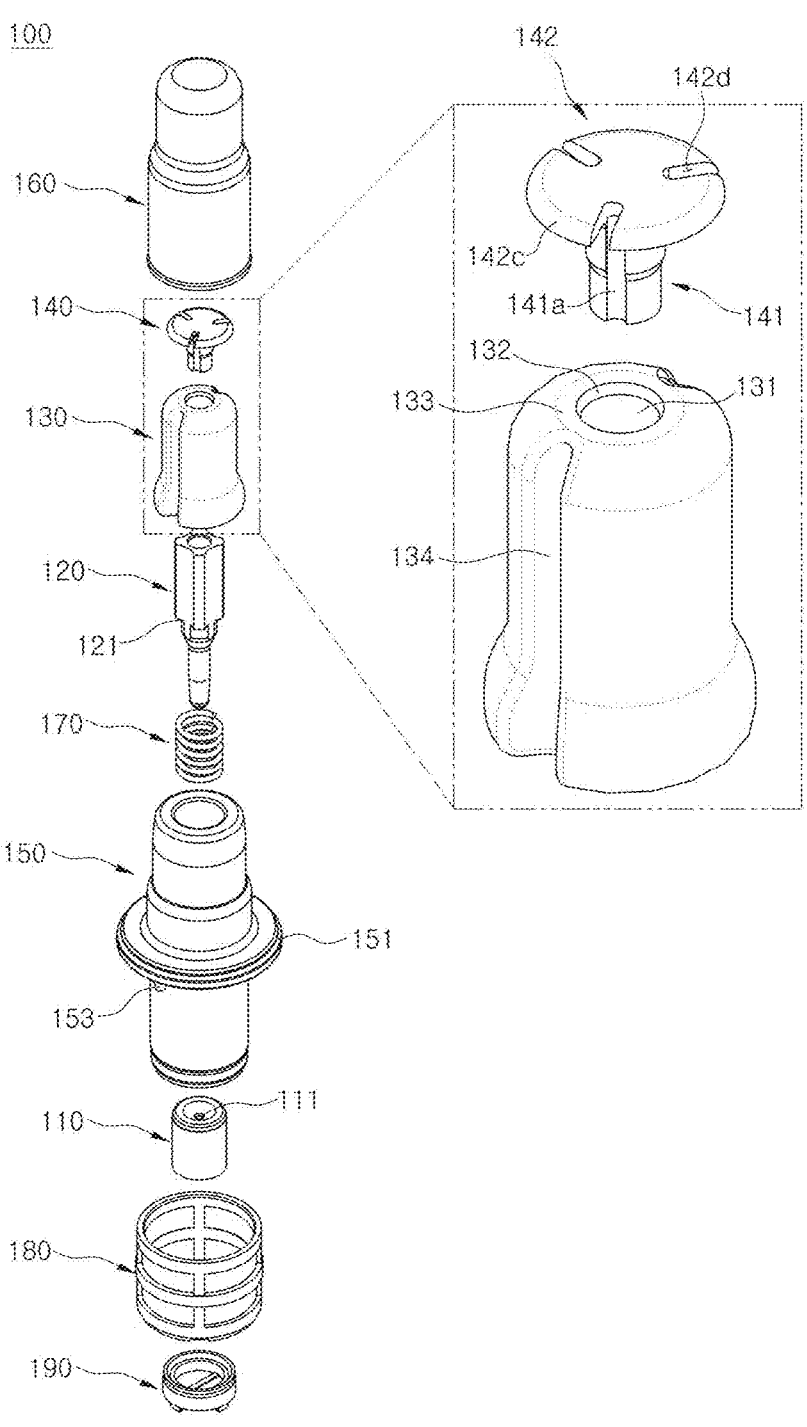
FIG. 2 is an exploded perspective view of a solenoid valve for a brake system according to an embodiment of the disclosure.
Figure 3:
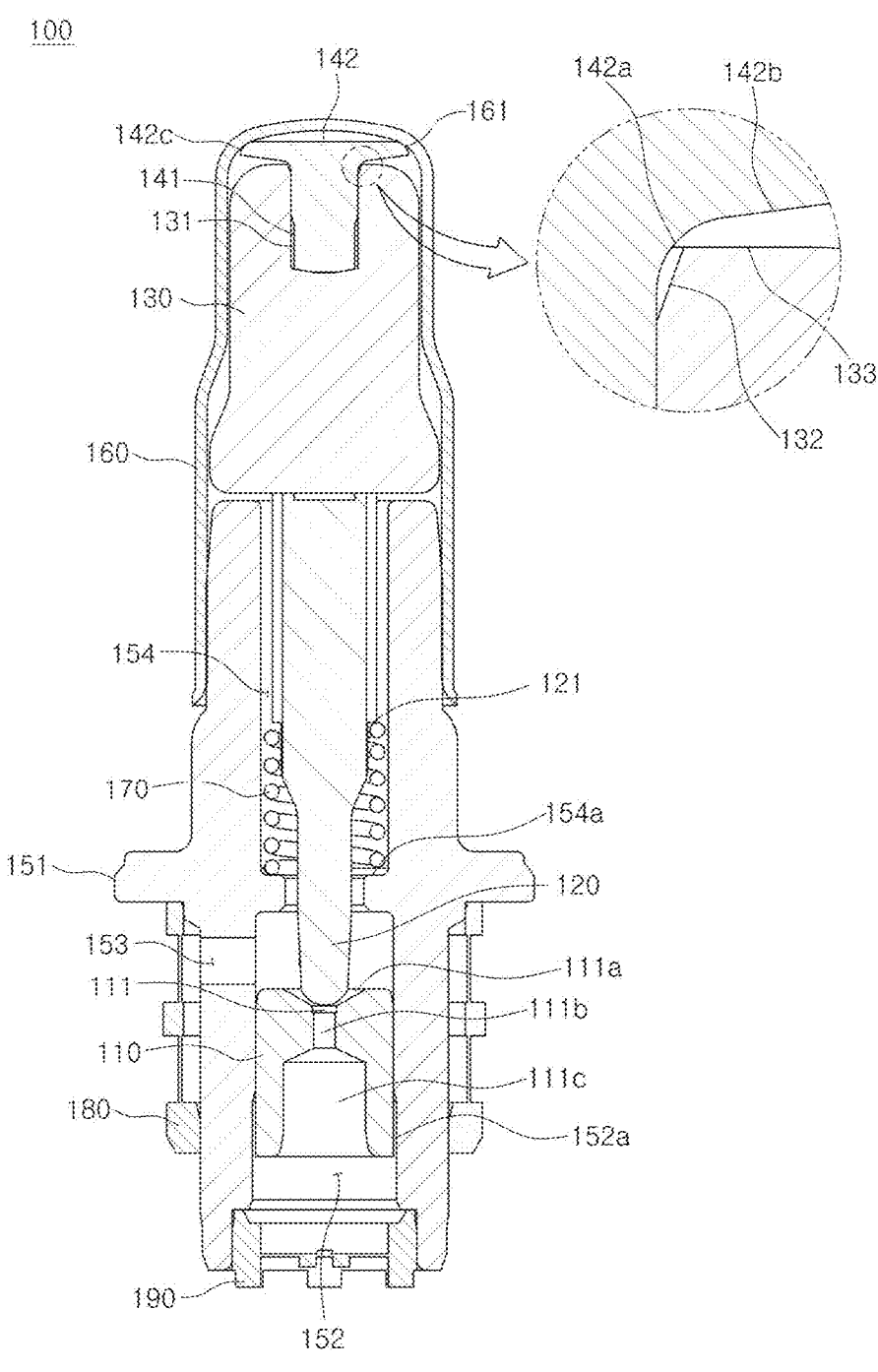
FIG. 3 is a cross-sectional view showing a coupled state of a solenoid valve for a brake system according to an embodiment of the disclosure.
Figure 4:
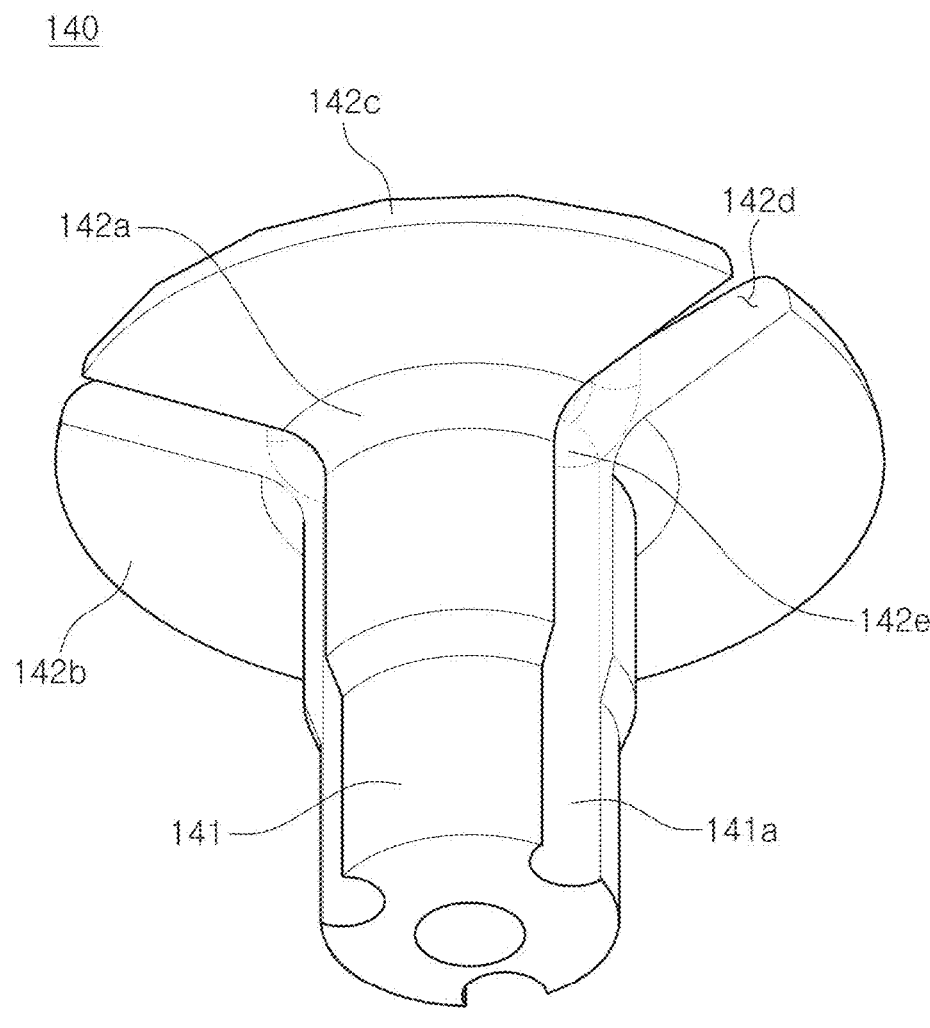
FIG. 4 is a bottom perspective view showing a damper of a solenoid valve for a brake system according to an embodiment of the disclosure.
Figure 5:
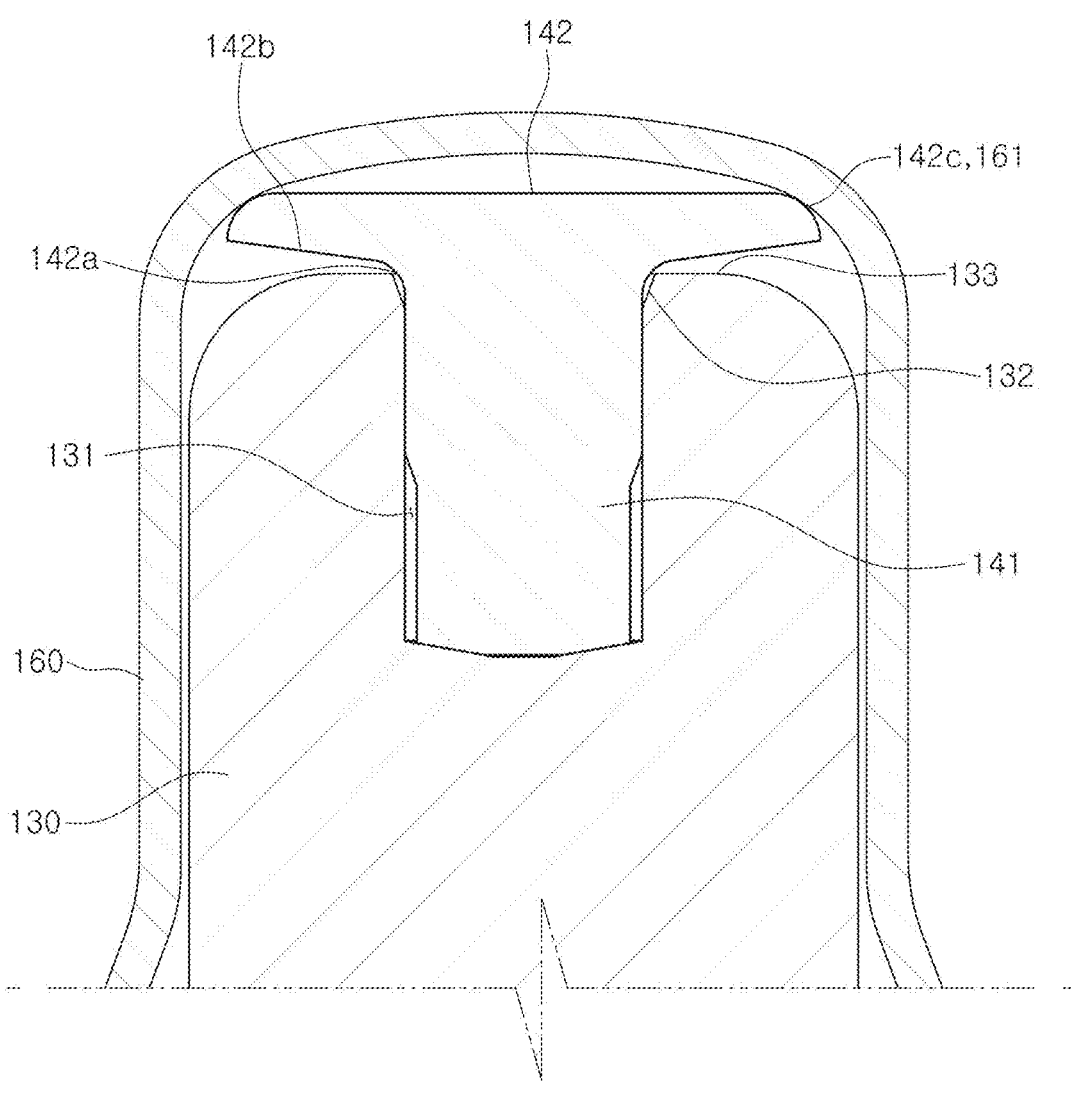
FIG. 5 is a cross-sectional view showing a contact state of a damper and a sleeve in a solenoid valve for a brake system according to an embodiment of the disclosure.
Figure 6:
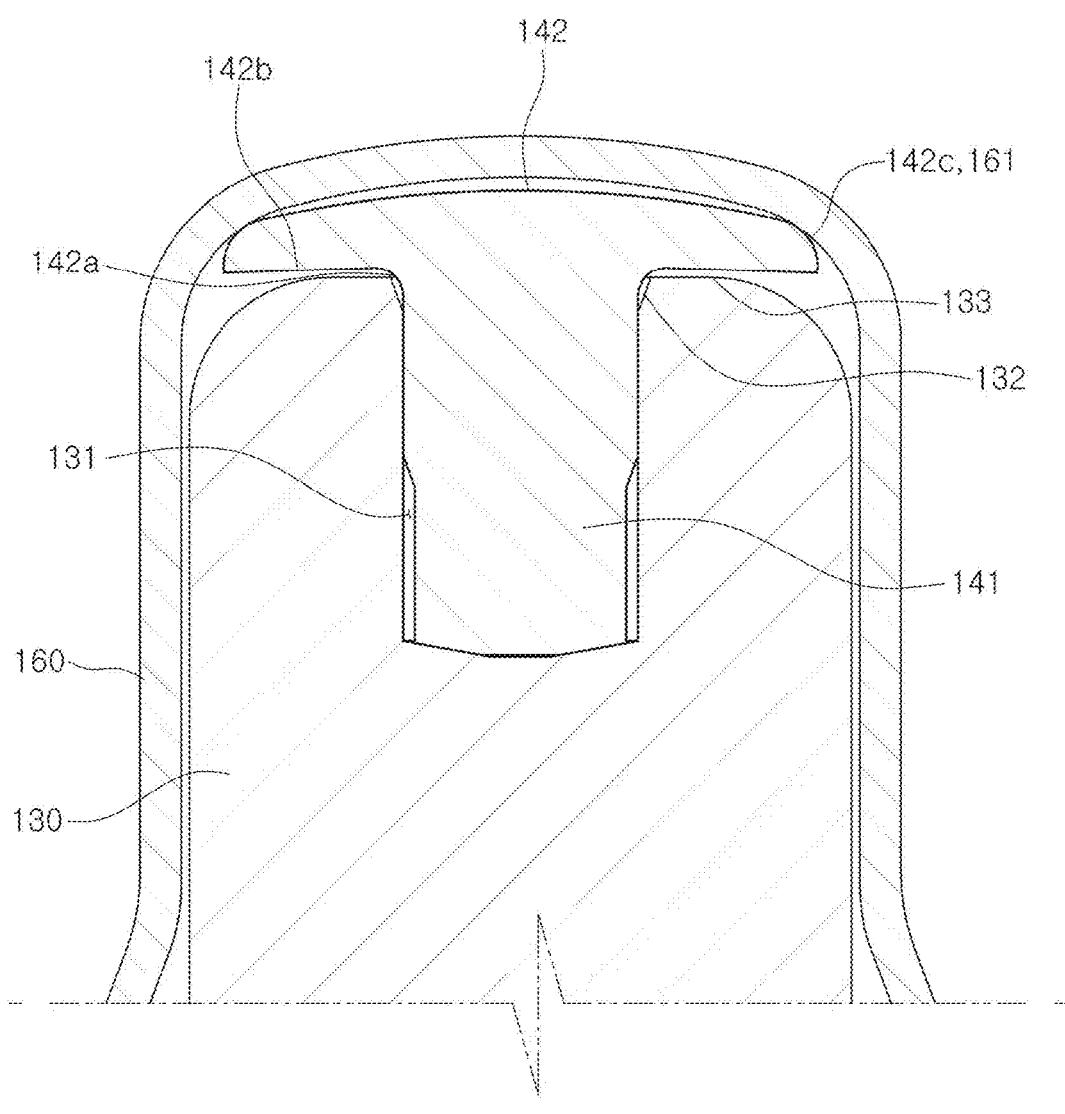
FIG. 6 is a cross-sectional view showing a deformed state of a damper by a collision with a sleeve due to a rise of an armature, in a solenoid valve for a brake system according to an embodiment of the disclosure.

Meanwhile, FIGS. 2 and 3 are an exploded perspective view of a solenoid valve for a brake system according to an embodiment of the disclosure, and a cross-sectional view showing a coupled state of the solenoid valve for the brake system, respectively, and FIG. 4 is a bottom perspective view showing a damper of a solenoid valve for a brake system according to an embodiment of the disclosure. Also, FIG. 5 is a cross-sectional view showing a contact state of a damper and a sleeve in a solenoid valve for a brake system according to an embodiment of the disclosure, and FIG. 6 is a cross-sectional view showing a deformed state of a damper by a collision with a sleeve due to a rise of an armature, in a solenoid valve for a brake system according to an embodiment of the disclosure.

Referring to FIGS. 2 to 6, the solenoid valve 100 for the brake system according to an embodiment of the disclosure may include a valve seat 110, a plunger 120, an armature 130, a damper 140, a magnetic core 150, a sleeve 160, an elastic member 170, an outlet filter 180, and an inlet filter 190.

The valve seat 110 may have a cylindrical shape and an orifice 111 may penetrate the valve seat 110 in an axial direction. Also, the orifice 111 may include a plunger resting portion 111*a*, wherein a hole that is opened or closed by the plunger 120 may be formed at a center, lower part in axial direction of the plunger resting portion 111*a* and an outer circumferential part extending from an outer circumference of the hole may be formed at an upper part of the plunger resting portion 111*a* to form a dish-shaped upper surface of the valve seat 110 which the plunger 120 is in close contact with, a small diameter portion 111*b* extending downward from the hole of the plunger resting portion 111*a*, and a large diameter portion 111*c* extending downward from the small diameter portion 111*b* with a larger diameter than the small diameter portion 111*b* by a taper-shaped, upper end of which a diameter increases gradually from the small diameter portion 111*b*. The large diameter portion 111*c* may further include a taper-shaped lower end of which a diameter further increases around a lower end of the valve seat 110.

The plunger 120 may have a bar shape, and include a hemispherical lower end portion for closing the hole of the plunger resting portion 111*a* and a supporting portion 121 protruding in a circumferential direction to support one end of the elastic member 170.

The armature 130 may be provided on an upper side of the plunger 120 and move back and forth in a vertical direction inside the sleeve 160 such that the orifice 111 is opened or closed by the plunger 120. To this end, an excitation coil (not shown) may be coupled to an outer circumferential surface of the sleeve 160. Also, the armature 130 may include a coupling hole 131 which is formed at the upper side and to which the damper 140 is coupled, a chamfer portion 132 provided on an outer circumferential surface of the coupling hole 131, a flat portion 133 extending from the chamber portion 132 in a diameter direction, and at least two armature flow paths 134 formed in the axial direction in an outer circumferential surface of the armature 130.

The damper 140 may include a body portion 141 inserted into the coupling hole 131 and coupled to the armature 130, and a head portion 142 provided at an upper side of the body portion 141, and the damper 140 may be formed of an elastically deformable material such as a synthetic resin material. An elastic strain of the damper 140 may be set to various values by a person skilled in the art who selects any one material from among various materials having various coefficients of elasticity.

The body portion 141 may have a cylindrical shape, and include a long groove 141a extending in the axial direction such that the body portion 141 is easily inserted into the coupling groove 131. The long groove 141a may be positioned at the same location in axial direction as a slot 142d which will be described below, and the number of the long groove 141a may also be equal to that of the slot 142d. Also, a maximum diameter of the body portion 141 may be equal to or greater than a maximum diameter of the coupling hole 131 such that the body portion 141 coupled to the coupling hole 131 does not move in the axial direction and the diameter direction.

The head portion 142 may include a first rounding portion 142a provided at a part extending from the body portion 141 and a taper portion 142b extending from the first rounding portion 142a, on the lower surface. As shown in FIG. 5, the first rounding portion 142a may be not in contact with the armature 130 due to the chamfer portion 132, and the taper portion 142b may extend outward in the diameter direction of the head portion 142 while being inclined upward in such a way as to be more spaced from an upper surface of the armature 130 at a location closer to the outer circumference.

Also, the head portion 142 may include a second rounding portion 142c bent from the taper portion 142b on the upper surface, and a plurality of slots 142d extending radially from the center part. As shown in FIG. 5, the second rounding portion 142c may be a part at which the damper 140 is actually in contact with a damper contact portion 161 of the sleeve 160, which will be described below. Also, each slot 142d may be provided at the same location in axial direction as the long groove 141a as described above with reference to FIG. 4, and an end formed at the center of the head portion 142 may extend up to the first rounding portion 142a in the axial direction. Also, the slots 142d may be arranged at equal intervals radially based on the center of the head portion 142 as the head portion 142 is divided into a plurality of bending arms.

Also, the head portion 142 may further include a third rounding portion 142e formed at a lower surface of each slot 142d to smoothly connect the slot 142d to the long groove 141a, as shown in FIG. 4.

The magnetic core 150 may form a body of the solenoid valve 100 for the brake system, and move the armature 130 downward to close the orifice 111 through the plunger 120, while power is applied to the excitation coil described above.

More specifically, the magnetic core 150 may include a flange 151 provided on the outer circumferential surface and supported by a modulator block (not shown), etc., a first flow path 152 provided in the axial direction, a second flow path 153 provided in the diameter direction, and a plunger accommodating space 154 for accommodating the plunger 120 therein.

The first flow path 152 may include a seat coupling portion 152a which penetrates the magnetic core 150 in the axial direction, is provided below the second flow path 153, and the valve seat 110 is coupled to, and the first flow path 152 may be connected to a flow path provided in the modulator block, etc. The valve seat 110 may be inserted into the first flow path 152 from a lower surface of the magnetic core 150 and coupled to the seat coupling portion 152a, as shown in FIG. 3.

The second flow path 153 may be provided in the diameter direction between the flange 151 and the valve seat 110 and connected to the flow path provided in the modulator block, etc. Also, the second flow path 153 may have a smaller diameter than the first flow path 152.

The plunger accommodating space 154 may extend from the valve seat 110 to an upper end of the magnetic core 150 via an upper side of the flange 151. Also, the plunger accommodating space 154 may include an elastic member resting portion 154a that supports a lower end of the elastic member 170 of which an upper end is supported to the supporting portion 121, when the plunger 120 is accommodated in the plunger accommodating space 154. Accordingly, the plunger 120 may be inserted toward the flange 151 from the upper end of the magnetic core 150, and the plunger 120 accommodated in the plunger accommodating space 154 may receive an elastic force from above by the elastic member 170, as shown in FIG. 2.

The sleeve 160 may include, as described above, an internal space where the armature 130 and the damper 140 are accommodated to guide a vertical movement of the armature 130, and the damper contact portion 161 located at an inner upper end of the sleeve 160, wherein the damper 140 contacts and collides with the damper contact portion 161, and the sleeve 160 may be coupled to an upper side of the magnetic core 150. The excitation coil (not shown) may be coupled to the outer circumferential surface of the sleeve 160, as described above. Also, an inner circumferential surface of the sleeve 160 may form a gap with the outer circumferential surface of the armature 130 such that the pressing medium such as brake oil flows though the gap.

As shown in FIGS. 5 and 6, the damper contact portion 161 may have a cross-sectional shape of an arc with a curved portion formed on the upper side. Accordingly, when the armature 130 rises and thus the damper 140 contacts or collides with the damper contact portion 161, a part of the damper 140 actually contacting the damper contact portion 161 may be the second rounding portion 142c.

The elastic member 170 may be supported by the elastic member resting portion 154a at the lower end and by the supporting portion 121 at the upper end to provide an elastic force to the plunger 120 upward, as described above. The elastic member 170 may be a coil spring partially surrounding one side of the plunger 120 that opens or closes the orifice 111, as shown in FIG. 2.

The outlet filter 180 may include a cylindrical frame provided with a plurality of openings in the diameter direction and a mesh portion (not shown) coupled to the openings to filter foreign materials contained in the pressing medium such as brake oil discharged or supplied from the second flow path 153. To this end, as shown in FIGS. 2 and 3, the outlet filter 180 may surround an outer circumferential surface of the magnetic core 150 from a lower portion of the magnetic core 150 and extend up to the second flow path 153, wherein an upper end of the outlet filter 180 may be supported to the flange 151.

The inlet filter 190 may include a disk-shaped frame including a plurality of openings in the axial direction and a mesh portion (not shown) coupled to the openings to filter foreign materials contained in the pressing medium such as brake oil that is supplied or discharged to the first flow path 152. To this end, the inlet filter 190 may be inserted toward the first flow path 152 from the lower side of the magnetic core 150 and coupled to the magnetic core 150, as shown in FIGS. 2 and 3.

Accordingly, in the solenoid valve 100 for the brake system according to an embodiment of the disclosure, configured as described above, while no power is supplied to the excitation coil, the plunger 120 may be maintained in a state of being moved upward by the elastic member 170 to maintain the orifice 111 in an open state.

Meanwhile, when a driver presses the brake pedal 21 for braking, power may be supplied to the excitation coil from the ECU in response to an electrical signal from the pedal displacement sensor, etc., and the armature 130 may move downward by an electromagnetic force with the magnetic core 150 to close the orifice 111 through the plunger 120.

Thereafter, when the driver releases pressure applied to the brake pedal 21 for releasing braking, the supply of power to the excitation coil from the ECU may stop in response to an electrical signal from the pedal displacement sensor, etc., and the plunger 120 and the armature 130 may rise by an elastic force of the elastic member 170. Accordingly, the damper 140 may collide with the damper contact portion 161 of the sleeve 160.

At this time, as shown in FIG. 6, the damper 140 may receive an upward force in the state in which the second rounding portion 142*c* is in contact with the damper contact portion 161, and as a result, an outer end of the head portion 142 with respect to the first rounding portion 142*a* may be bent. That is, the head portion 142 which is the plurality of bending arms divided by the slots 142*d* may reduce an impact between the armature 130 and the sleeve 160.

Also, in the damper 140, the first rounding portion 142*a* to which a relatively great external force is applied may be thicker than the second rounding portion 142*c*, be spaced apart from the armature 130 by the chamfer portion 132, and be prevented from being damaged through stress distribution by the round shape, whereas the second rounding portion 142*c* may be thinner than the first rounding portion 142*a* and more spaced apart from the armature 130 due to the taper portion 142*b* to effectively absorb an impact through an increase of the amount of bending.

Also, the plurality of bending arms divided by the slots 142*d* may be further prevented from being damaged through the long groove 141*a* formed in the body portion 141 and the third rounding portion 142*e* formed in each slot 142*d*, as described above.

Accordingly, the solenoid valve for the brake system according to an embodiment may provide a comfortable environment for an occupant of a vehicle even during frequent brake operations by significantly reducing noise caused by a collision between the damper and the sleeve when the valve operates.

Also, the solenoid valve for the brake system according to an embodiment may prevent damage of the sleeve, etc. and improve durability by increasing a collision time through bending of the damper upon a collision between the damper and the sleeve when the valve operates to reduce an impact force transferred to the sleeve.

Also, the solenoid valve for the brake system according to an embodiment may improve durability by preventing deformation and damage of the damper due to repeated collisions between the damper and the sleeve.

Meanwhile, the solenoid valve 100 for the brake system according to an embodiment may be applicable to Normal Open Type of valves that are normally open and closed in response to reception of a closing signal from the ECU, among valves constructing the brake system, as well as the valve provided on the backup line 60 described above.

So far, the embodiments of the solenoid valve for the brake system according to the disclosure have been described in detail. However, it will be apparent that various modifications can be made without deviating from the scope of the disclosure.

Therefore, the scope of the disclosure is not limited to the above-described embodiments, and should be defined by the following claims and the equivalents of the claims.

That is, it should be understood that the above-described embodiments are merely for illustrative purposes and not for limitation purposes in all aspects. The scope of the disclosure is indicated by the claims to be described below rather than the detailed description, and should be interpreted as including all changes or modified forms derived from the meaning and scope of the claims and the concept of equivalents thereof.

What is claimed is:

1. A solenoid valve for a brake system, the solenoid including:

an armature positioned inside a sleeve and configured to move up and down along an axial direction together with a plunger to open or close an orifice of a valve seat; and a damper provided between the armature and an inner upper end of the sleeve, wherein the damper comprises:

a body portion inserted in a coupling hole provided in an upper side of the armature; and a head portion being at least two or more bending arms divided by a slot extending in a diameter direction, the head portion being provided at an upper end of the body portion, wherein the body portion includes at least two or more long grooves extending in an axial direction, and wherein each of the long grooves is positioned at the same location in axial direction as the slot.

2. The solenoid valve for the brake system of claim 1, wherein the head portion further includes a third rounding portion provided between at least one of the long grooves and the slot.

3. The solenoid valve for the brake system of claim 1, wherein the head portion further includes:

a first rounding portion extending from an upper end of the body portion on a lower surface of the head portion;

a taper portion corresponding to the lower surface of the head portion, and extending outward from the first rounding portion in such a way as to be inclined upward from a center of the head portion; and a second rounding portion formed on an upper surface of the head portion and bent from the taper portion.

4. The solenoid valve for the brake system of claim 3, wherein the armature includes:

a chamber portion provided on an outer circumferential surface of the coupling hole and spaced apart from the first rounding portion; and a flat portion extending from the chamber portion in a diameter direction.

5. The solenoid valve for the brake system of claim 3, wherein the sleeve includes a damper contact portion provided at an inner upper end of the sleeve, wherein the second rounding portion is in contact with the damper contact portion.

6. The solenoid valve for the brake system of claim 1, being a normal open type.

7. A solenoid valve for a brake system, the solenoid comprising:

a valve seat including an orifice penetrating the valve seat in an axial direction;

a plunger configured to open or close the orifice by moving back and forth in the axial direction;

an elastic member configured to provide an elastic force in a direction in which the plunger opens the orifice;

an armature provided on an upper side of the plunger and configured to move back and forth in the axial direction together with the plunger;

a magnetic core accommodating the valve seat, the plunger, and the elastic member therein, and configured to provide a driving force to the armature in a direction in which the plunger closes the orifice;

a sleeve accommodating the armature therein such that the armature is movable back and forth in the axial direction inside the sleeve, the sleeve being coupled to the magnetic core; and a damper provided between the armature and the sleeve, and configured to be elastically deformed toward the armature at an outer circumferential portion by being pressed to an inner upper end of the sleeve by an elastic force provided by the elastic member, and be elastically restored upward at the outer circumferential portion by being spaced apart from the inner upper end of the sleeve by a driving force provided by the magnetic core, wherein the damper comprises a body portion inserted in a coupling groove provided in an upper side of the armature, and a head portion being at least two or more bending arms divided by a slot extending in a diameter direction, the head portion being provided at an upper end of the body portion, wherein the body portion includes at least two or more long grooves extending in an axial direction, and wherein each of the long grooves is positioned at the same location in axial direction as the slot.

8. The solenoid valve for the brake system of claim 7, wherein the head portion includes a first rounding portion extending from the upper end of the body portion on a lower surface of the head portion, a taper portion extending outward from the first rounding portion on the lower surface in such a way as to be inclined upward from a center of the head portion, and a second rounding portion bent from the taper portion on an upper surface of the head portion.

9. The solenoid valve for the brake system of claim 8, wherein the body portion includes at least two or more long grooves extending in the axial direction.

10. The solenoid valve for the brake system of claim 9, wherein the slot of the head portion extends in the diameter direction from the upper end of each of the long grooves via a third rounding portion.

11. The solenoid valve for the brake system of claim 8, wherein the armature includes:

a chamber portion provided on an outer circumferential surface of the coupling hole and spaced apart from the first rounding portion; and a flat portion extending from the chamber portion in a diameter direction.

12. The solenoid valve for the brake system of claim 8, wherein the sleeve includes a damper contact portion provided at an inner upper end of the sleeve, wherein the second rounding portion is in contact with the damper contact portion.

13. The solenoid valve for the brake system of claim 7, wherein the magnetic core includes:

a flange protruding from an outer circumferential surface of the magnetic core;

a first flow path extending in the axial direction, wherein the valve seat is accommodated in the first flow path;

a second flow path extending in a radial direction between the valve seat and the flange; and a plunger accommodating space formed above the valve seat, wherein the plunger is accommodated in the plunger accommodating space.

14. The solenoid valve for the brake system of claim 13, wherein one end of the elastic member is supported by a supporting portion provided in the plunger, and another end of the elastic member is supported by an elastic member resting portion provided in the plunger accommodating space.

15. The solenoid valve for the brake system of claim 7, further comprising:

an inlet filter provided toward the first flow path; and an outlet filter provided toward the second flow path.

16. The solenoid valve for the brake system of claim 7, wherein the sleeve further includes an excitation coil coupled to an outer circumferential surface of the sleeve and configured to generate a driving force of the magnetic coil.

17. The solenoid valve for the brake system of claim 7, wherein the armature further includes an armature flow path extending from a lower end to an upper end of the armature in the axial direction.

18. The solenoid valve for the brake system of claim 7, being a normal open type.

19. A solenoid valve for a brake system, the solenoid including:

an armature positioned inside a sleeve and configured to move up and down along an axial direction together with a plunger to open or close an orifice of a valve seat; and a damper provided between the armature and an inner upper end of the sleeve, wherein the damper comprises:

a body portion inserted in a coupling hole provided in an upper side of the armature; and a head portion being at least two or more bending arms divided by a slot extending in a diameter direction, the head portion being provided at an upper end of the body portion, wherein the head portion includes:

a first rounding portion extending from an upper end of the body portion on a lower surface of the head portion;

a taper portion corresponding to the lower surface of the head portion, and extending outward from the first rounding portion in such a way as to be inclined upward from a center of the head portion; and a second rounding portion formed on an upper surface of the head portion and bent from the taper portion.

20. The solenoid valve for the brake system of claim 19, wherein the armature includes:

a chamber portion provided on an outer circumferential surface of the coupling hole and spaced apart from the first rounding portion; and a flat portion extending from the chamber portion in a diameter direction.

21. The solenoid valve for the brake system of claim 19, wherein the sleeve includes a damper contact portion provided at an inner upper end of the sleeve, wherein the second rounding portion is in contact with the damper contact portion.

* * * * *